(12) United States Patent
Holman et al.

(10) Patent No.: US 9,678,329 B2
(45) Date of Patent: Jun. 13, 2017

(54) ANGLED FACETS FOR DISPLAY DEVICES

(71) Applicants: Robert L Holman, San Jose, CA (US); Kristopher A Lavery, San Jose, CA (US); Ming-Hau Tung, San Francisco, CA (US)

(72) Inventors: Robert L Holman, San Jose, CA (US); Kristopher A Lavery, San Jose, CA (US); Ming-Hau Tung, San Francisco, CA (US)

(73) Assignee: QUALCOMM Inc., San Diego, CA (US)

(*) Notice: Subject to any disclaimer, the term of this patent is extended or adjusted under 35 U.S.C. 154(b) by 722 days.

(21) Appl. No.: 13/624,333

(22) Filed: Sep. 21, 2012

(65) Prior Publication Data

US 2013/0162656 A1    Jun. 27, 2013

Related U.S. Application Data

(60) Provisional application No. 61/579,554, filed on Dec. 22, 2011.

(51) Int. Cl.
| | |
|---|---|
| G06F 15/00 | (2006.01) |
| G02B 26/00 | (2006.01) |
| G02F 1/19 | (2006.01) |
| G02B 5/08 | (2006.01) |
| G06F 3/044 | (2006.01) |

(52) U.S. Cl.
CPC ............ *G02B 26/001* (2013.01); *G02B 5/08* (2013.01); *G02F 1/19* (2013.01); *G06F 3/044* (2013.01); *G06F 15/00* (2013.01)

(58) Field of Classification Search
CPC ....................................................... G02B 1/005
USPC .......................... 359/290, 865, 529; 345/501
See application file for complete search history.

(56) References Cited

U.S. PATENT DOCUMENTS

| | | | |
|---|---|---|---|
| 6,252,718 B1 * | 6/2001 | Lefevre .......................... | 359/633 |
| 6,304,364 B1 * | 10/2001 | Qin et al. ...................... | 359/291 |
| 6,459,716 B1 * | 10/2002 | Lo et al. ....................... | 372/50.1 |
| 7,138,984 B1 * | 11/2006 | Miles ............................ | 345/173 |

(Continued)

FOREIGN PATENT DOCUMENTS

| | | |
|---|---|---|
| CN | 101019071 A | 8/2007 |
| CN | 101878521 A | 11/2010 |

(Continued)

OTHER PUBLICATIONS

MEMS-based interferometric modulator for display applications Mark W. Miles, 1999.*

(Continued)

*Primary Examiner* — Javid A Amini
(74) *Attorney, Agent, or Firm* — Knobbe, Martens, Olson & Bear, LLP

(57) ABSTRACT

This disclosure provides systems, methods and apparatus for provided masked structures on an embossed substrate. In one aspect, these masked structures may be reflected facets for use as part of a frontlight film. In another aspect, these masked structures may be masked wiring for use as part of a capacitive touchscreen array. In one aspect, the structures may have a discrete mask formed thereon, while in other aspects, these structures may have self-masking attributes, and may include an interferometric black mask.

27 Claims, 13 Drawing Sheets

(56) References Cited

U.S. PATENT DOCUMENTS

| | | | |
|---|---|---|---|
| 7,282,307 B2 | 10/2007 | Hector et al. | |
| 7,382,513 B2* | 6/2008 | Yang | 359/290 |
| 7,643,199 B2* | 1/2010 | Lan | 359/247 |
| 7,863,079 B2 | 1/2011 | Kothari et al. | |
| 7,969,638 B2* | 6/2011 | Xu et al. | 359/242 |
| 8,021,818 B2 | 9/2011 | Kwon et al. | |
| 8,050,569 B2* | 11/2011 | Habberstad et al. | 398/118 |
| 8,058,549 B2* | 11/2011 | Kothari et al. | 136/257 |
| 8,130,440 B2* | 3/2012 | Kothari et al. | 359/290 |
| 8,169,686 B2* | 5/2012 | Kothari et al. | 359/290 |
| 8,243,360 B2* | 8/2012 | Kothari | 359/290 |
| 8,346,048 B2 | 1/2013 | Bita et al. | |
| 8,363,303 B2* | 1/2013 | Horning et al. | 359/290 |
| 8,494,312 B2* | 7/2013 | Carralero et al. | 385/6 |
| 8,780,434 B1* | 7/2014 | Atnip | 359/290 |
| 8,797,628 B2* | 8/2014 | Kothari et al. | 359/290 |
| 9,121,979 B2 | 9/2015 | Bita et al. | |
| 2003/0043157 A1* | 3/2003 | Miles | 345/540 |
| 2006/0066586 A1 | 3/2006 | Gally et al. | |
| 2006/0132383 A1 | 6/2006 | Gally et al. | |
| 2007/0170540 A1* | 7/2007 | Chung et al. | 257/499 |
| 2009/0073534 A1* | 3/2009 | Lee et al. | 359/238 |
| 2009/0078944 A1 | 3/2009 | Kubota et al. | |
| 2009/0142902 A1 | 6/2009 | Subramanian | |
| 2009/0213451 A1* | 8/2009 | Tung et al. | 359/291 |
| 2010/0008628 A1* | 1/2010 | Shani | G02B 6/0018 385/49 |
| 2010/0302218 A1 | 12/2010 | Bita et al. | |
| 2011/0157058 A1 | 6/2011 | Bita et al. | |
| 2011/0157093 A1 | 6/2011 | Bita et al. | |
| 2011/0205466 A1 | 8/2011 | Lee et al. | |
| 2011/0227487 A1* | 9/2011 | Nichol et al. | 315/158 |
| 2011/0255303 A1* | 10/2011 | Nichol et al. | 362/606 |
| 2012/0120682 A1* | 5/2012 | Sasagawa et al. | 362/624 |
| 2012/0161277 A1 | 6/2012 | Kim et al. | |
| 2012/0194896 A1* | 8/2012 | Kothari et al. | 359/290 |
| 2014/0118360 A1 | 5/2014 | Ma et al. | 345/501 |
| 2014/0354601 A1* | 12/2014 | Bita et al. | 345/175 |

FOREIGN PATENT DOCUMENTS

| | | |
|---|---|---|
| JP | 6224221 A | 8/1994 |
| JP | 2013516024 A | 5/2013 |
| JP | 2013530412 A | 7/2013 |
| WO | WO-2009154957 A2 | 12/2009 |
| WO | WO-2010138761 A1 | 12/2010 |
| WO | WO-2011082088 A1 | 7/2011 |
| WO | WO-2011130718 A2 | 10/2011 |

OTHER PUBLICATIONS

Conformal Grating Electromechanical System (GEMS) for High-Speed Digital Light Modulation Marek W. Kowarz, John C. Brazas, Jr., and James G. Phalen, 2002 IEEE.*
International Search Report and Written Opinion—PCT/US2012/069876—ISA/EPO—May 5, 2013.
Partial International Search Report—PCT/US2012/069876—ISA/EPO—Mar. 6, 2013.
Taiwan Search Report—TW101149113—TIPO—Jul. 22, 2016.

* cited by examiner

| | Common Voltages | | | | |
|---|---|---|---|---|---|
| Segment Voltages | | $VC_{ADD\_H}$ | $VC_{HOLD\_H}$ | $VC_{REL}$ | $VC_{HOLD\_L}$ | $VC_{ADD\_L}$ |
| | $VS_H$ | Stable | Stable | Relax | Stable | Actuate |
| | $VS_L$ | Actuate | Stable | Relax | Stable | Stable |

ANGLED FACETS FOR DISPLAY DEVICES

CROSS-REFERENCE TO RELATED APPLICATIONS

This disclosure claims priority to U.S. Provisional Patent Application No. 61/579,554, filed Dec. 22, 2011, entitled "ANGLED FACETS FOR DISPLAY DEVICES," and assigned to the assignee hereof. The disclosure of the prior application is considered part of, and is incorporated by reference in, this disclosure.

TECHNICAL FIELD

This disclosure relates to methods of forming components of electromechanical systems devices and the components formed thereby.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus including a flexible substrate having a plurality of indentations formed in a first surface of the substrate, and reflective facets located at least partially within the indentations, where the reflective facets include a reflective surface located on the side of the facet facing the indentations, and a facet masking structure disposed on the opposite side of the substrate, where the facet masking structure is less reflective than the reflective surface.

The facet masking structure may include a layer of photoresist or an interferometric black mask. The apparatus may additionally include a plurality of masked wires located on the flexible substrate, where each of the plurality of masked wires includes a strip of conductive material, and a wire masking structure, where the wire masking layer is less reflective than the strip of conductive material.

Another innovative aspect of the subject matter described in this disclosure can be implemented in a method of fabricating an apparatus, including providing a substrate having a plurality of indentations formed on a first surface of the substrate, forming a reflective layer over the first surface of the substrate, forming a patterned masking layer over the reflective layer, and patterning the reflective layer using the patterned masking layer as a mask to form masked reflective facets within the indentations in the first surface of the substrate.

The substrate may be flexible, or may be substantially rigid. Patterning the reflective layer may also include patterning the reflective layer using the masking layer as a mask to form masked wiring extending over flat portions of the first surface of the substrate located between the indentations in the first surface of the substrate.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
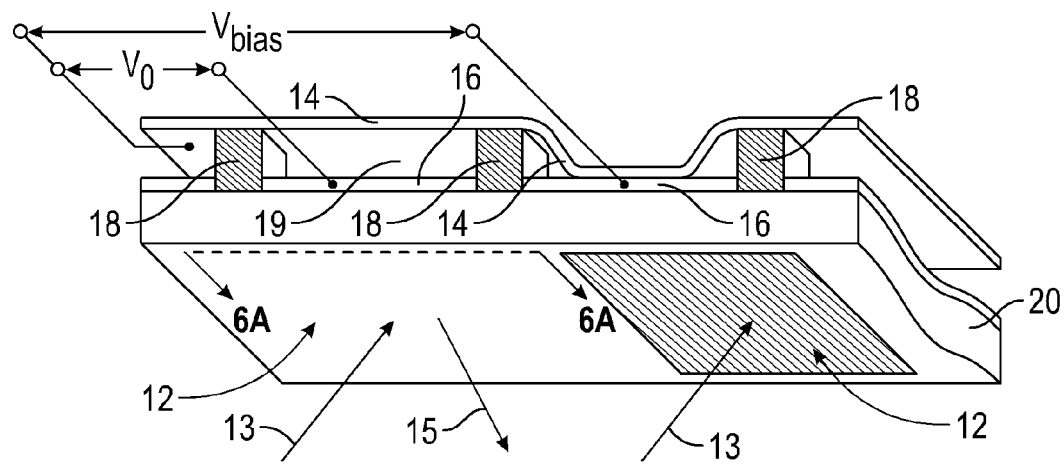
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

Display devices may include complimentary structures formed thereon to supplement the operation of the display device. For example, frontlight systems can be placed in front of a display device to illuminate a reflective display, and touchscreen arrays can be placed on the front of a display device to receive user input. These and similar structures are generally provided with a supplemental mask, or include self-masking attributes, so that they can be placed in a location between the display and a viewer without significantly impacting the appearance of the display. These complimentary structures can be formed on one or more substrates distinct from the display device. These substrates may be flexible plastic or glass substrates which may be flexible or rigid. The substrates with the complimentary structures may then be attached (e.g., by adhesion, bonding, etc.) to the display device or placed in close proximity (near) to the display device.

Particular implementations of the subject matter described in this disclosure can be implemented to realize one or more of the following potential advantages. Because these complementary structures such as touchscreens and frontlight films do not require alignment as precise as components of the display device itself, they can be formed on one or more separate substrates and then attached to the display device. By using a roll-to-roll process, such components can be simultaneously fabricated for a large number of display devices, reducing the overall cost of the display devices.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when actuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows indicating light 13 incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
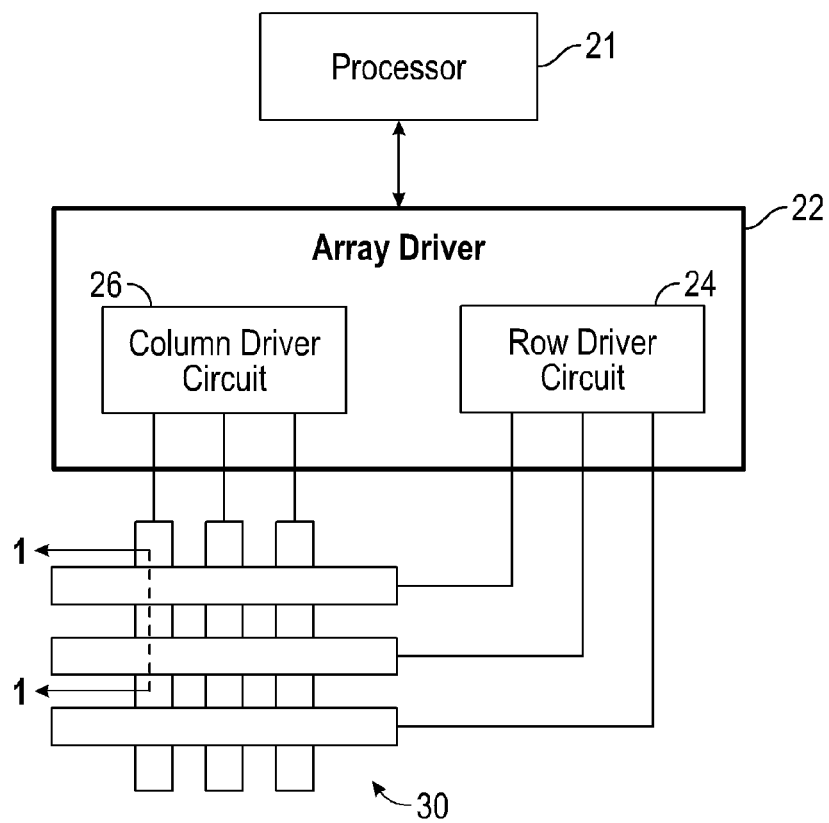
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
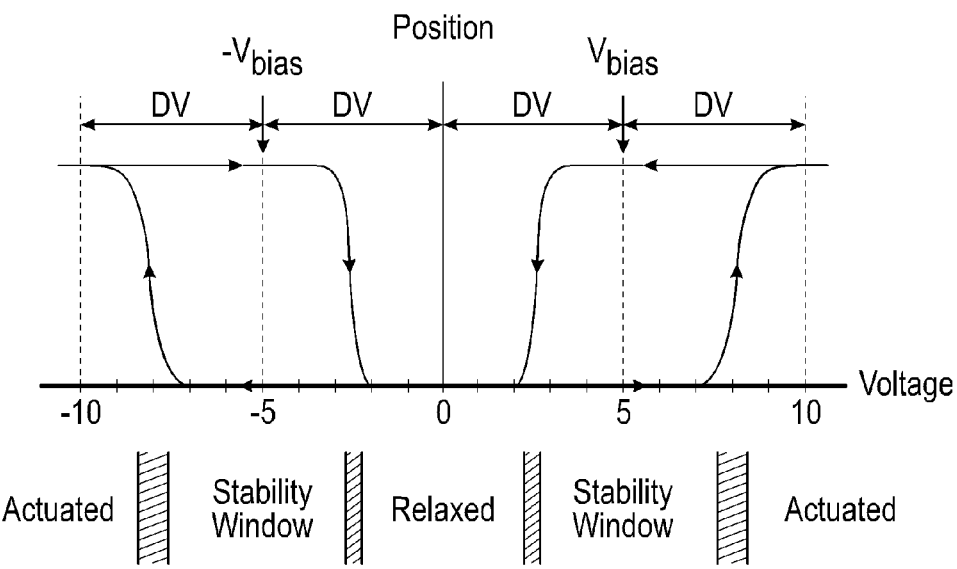
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
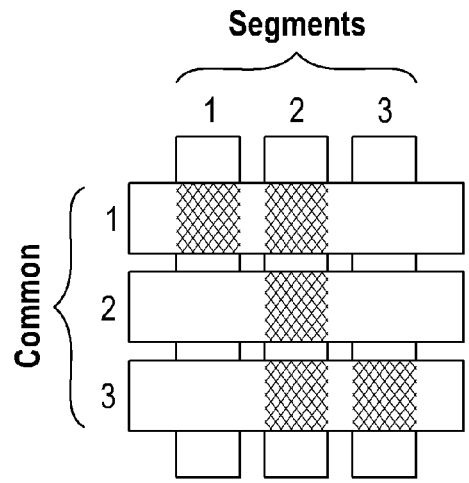
FIG. 5A shows an example of a diagram illustrating a frame of display data in the 3×3 interferometric modulator display of FIG. 2.
Figure 5B:
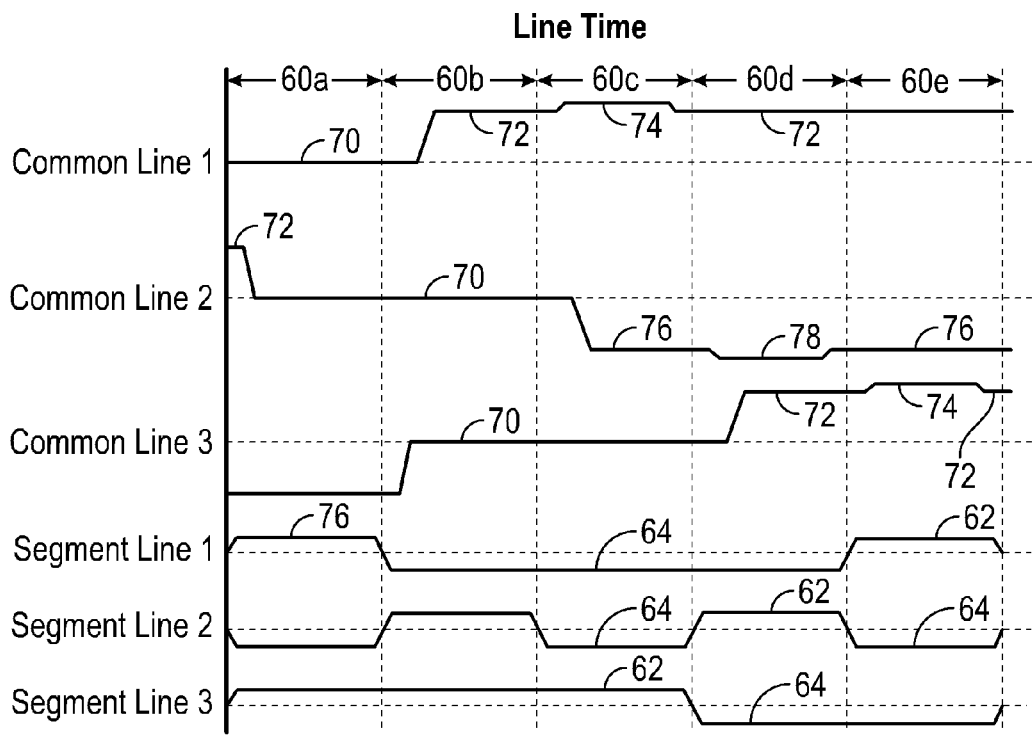
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$-relax and $VC_{HOLD\_L}$-stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
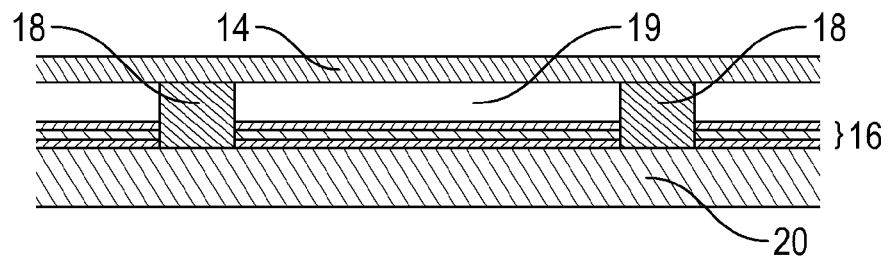
FIG. 6A shows an example of a partial cross-section of the interferometric modulator display of FIG. 1.
Figure 6B:
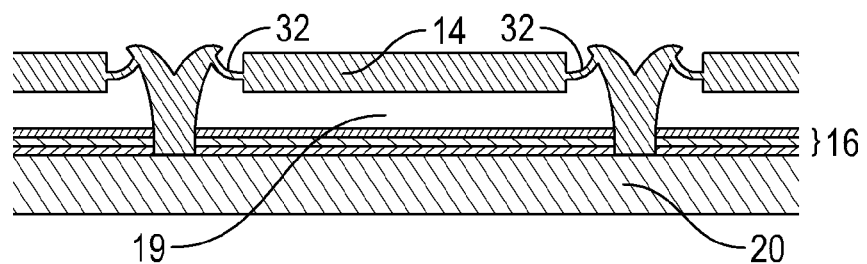
FIGS. 6B-6E show examples of cross-sections of varying implementations of interferometric modulators.
Figure 6C:
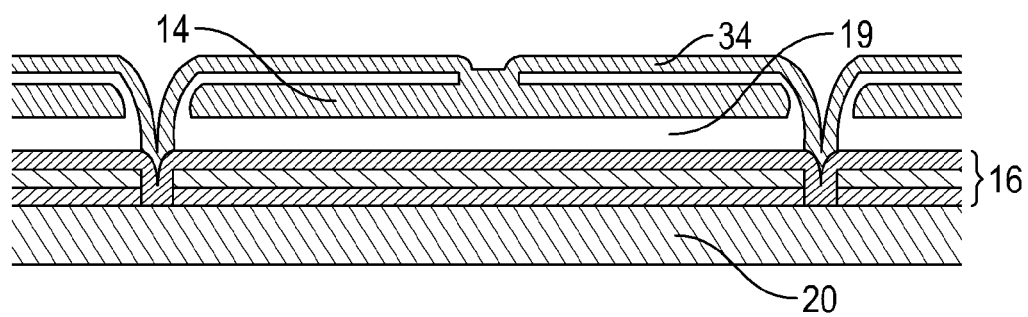

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
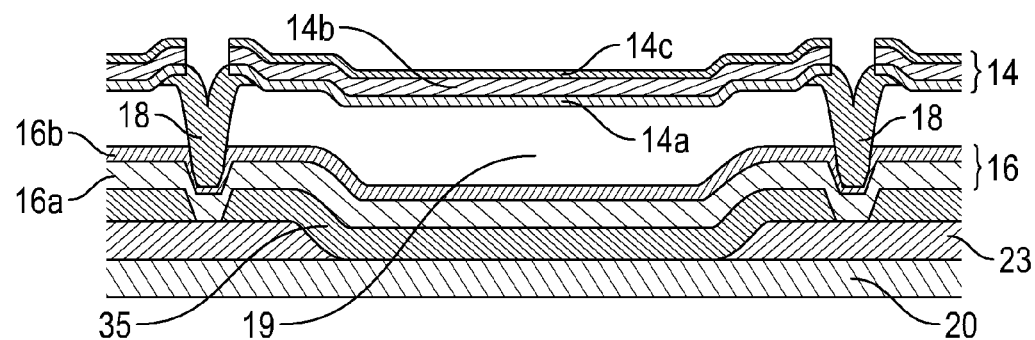

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
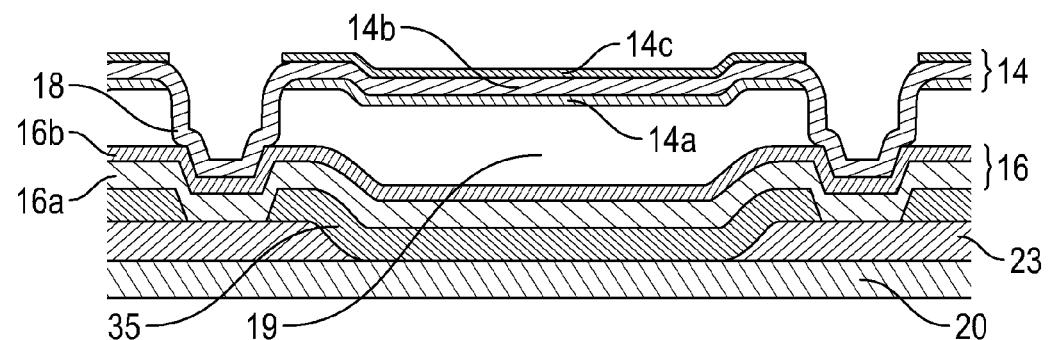

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
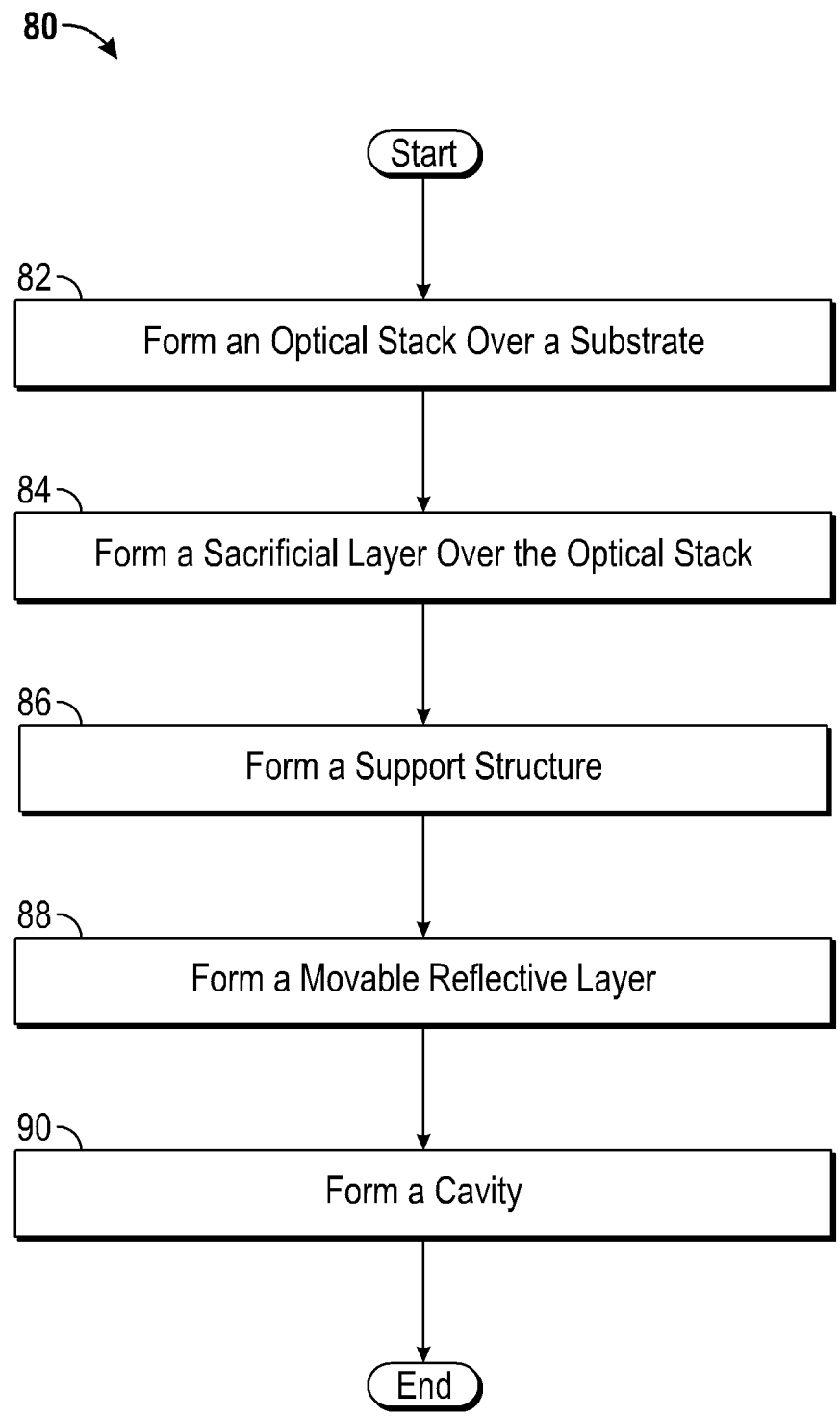
FIG. 7 shows an example of a flow diagram illustrating a manufacturing process for an interferometric modulator.
Figure 8A:
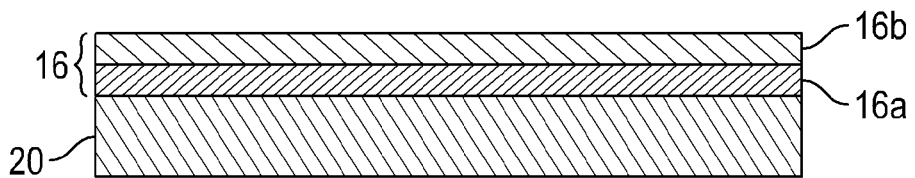
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
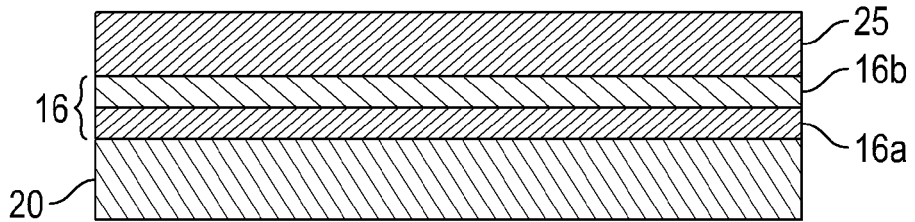

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
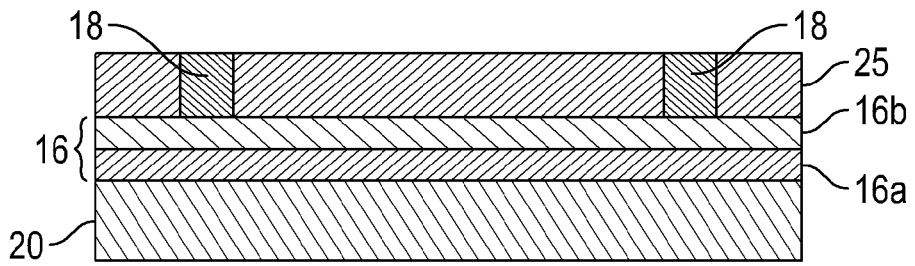

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
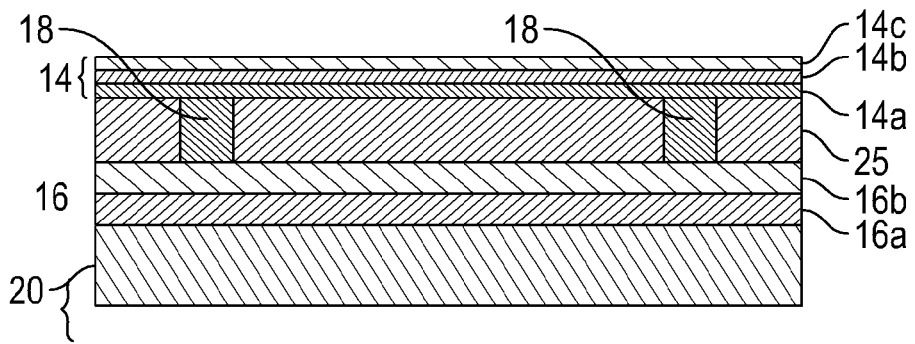
Figure 8E:
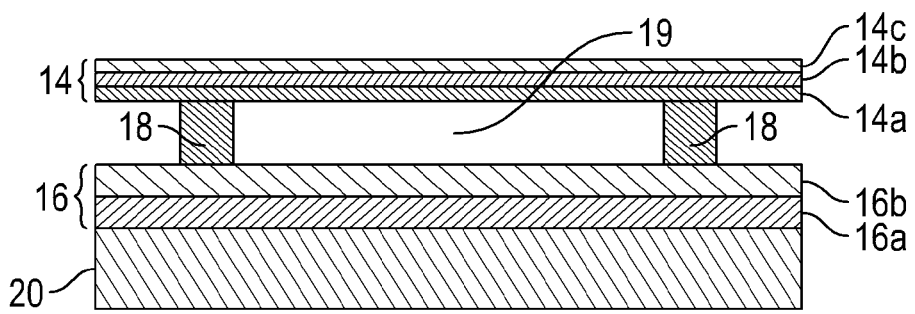

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

In certain implementations, electromechanical system (EMS) devices may be incorporated into display devices which include frontlights for redirecting light towards a display array, or touchscreens for receiving user input. Certain implementations of frontlights and touchscreens include structures which overlie an active area of the display but are masked to reduce the optical effect of these structures on the appearance of the display.

For example, certain implementations of frontlight films include reflective facets which are configured to redirect light propagating within the frontlight film towards the display array. In display devices which include reflective display elements, such as interferometric modulators, this redirected waveguiding light is incident upon the reflective display elements and then reflected back towards a viewer, through the frontlight film. Thus, such a frontlight film allows an illuminating light source to be positioned at a location offset from the display itself, such as at one of the edges of the frontlight film. Light from the light source can propagate throughout the frontlight film through total internal reflection before it strikes a facet and is redirected out of the frontlight film and towards a display array. Because these reflective facets may in some implementations include a reflective material, a mask may be provided on the side of the reflective material opposite the display array to prevent light from reflecting off of the back side of the reflective material, interfering with the appearance of the display device.

Similarly, a touch screen array may include a plurality of crisscrossing electrodes arranged in a grid pattern to form a capacitive touchscreen array. Certain materials which may be used in these electrodes may be partially or highly reflective. These electrodes may also be provided with a mask on the viewable side of the electrode to prevent undesirable optical effects resulting from the reflection of light off of the electrodes.

In certain implementations, one or both of these frontlight facets or touchscreen electrodes may be formed on a flexible substrate, and the flexible substrate with the masked structures formed thereon may then be attached to a display device, where it will serve as part of a frontlight system or a touchscreen. In further implementations, components of the touchscreen or frontlight may be formed on a flexible substrate which is much larger than the display devices, and portions of the flexible substrate may be separated from one another and attached to or otherwise secured relative to individual display devices using a roll-to-roll process. In other implementations, the processes described below may be used to form masked structures on more rigid substrates, or substrates that are less flexible than substrates used in roll-to-roll processes. These more rigid substrates may be attached to or otherwise secured relative to display devices using other suitable manufacturing processes.

Figure 9A:
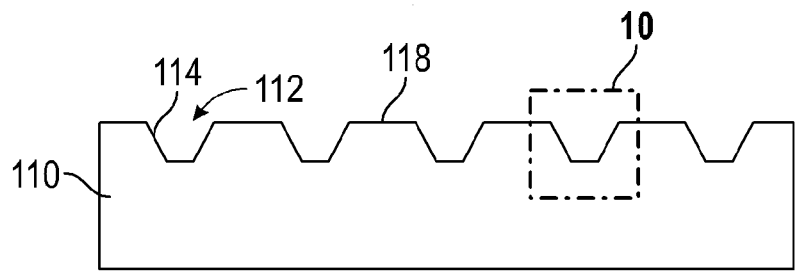
FIG. 9A-9E show an example of a process for forming masked structures on a flexible substrate.

FIGS. 9A-9E show an example of a process for forming masked structures on a flexible substrate. In FIG. 9A, a substrate 110 has been provided, having indentations 112 formed therein. The substrate 110 may include any suitable light-transmissive material. In particular implementations, particularly when the substrate 110 will form part of a light guide, the material may be selected based in part on the extinction coefficient of the material. In some implementations, the substrate 110 and other bounding materials which form a part of the light guide, such as pressure-sensitive adhesives (PSA) or optically clear adhesives (OCA), may have an extinction coefficient less than $1 \times 10^{-7}$. In other implementations, the substrate may include materials having an extinction coefficient which is equal to or greater than $1 \times 10^{-7}$.

In a particular implementation, the substrate 110 may include a clear plastic such as poly(methyl methacrylate) (PMMA), which has an extinction coefficient that depends to large part on the purity of the PMMA starting material and the degree to which additives have been used to modify flow characteristics in forming or to reduce UV absorption, as two examples. High optical quality PMMA has an extinction coefficient of $7 \times 10^{-9}$, which is roughly two orders of magnitude lower than that of many commercial glasses (for example, the extinction coefficient of Corning Eagle Glass XG through a thickness of 0.7 mm has an average extinction coefficient of roughly $4 \times 10^{-9}$ for all visible wavelengths from 435 nm to 644 nm).

In one implementation, the substrate 110 may be embossed to form the indentations 112 using any suitable method, including but not limited to thermal embossing, UV embossing, and imprint embossing. In other implementations, a substrate 110 having indentations 112 may be formed by a cast and cure method, or by wet or dry etching the indentations 112 into a surface of the substrate 110.

Figure 10A:
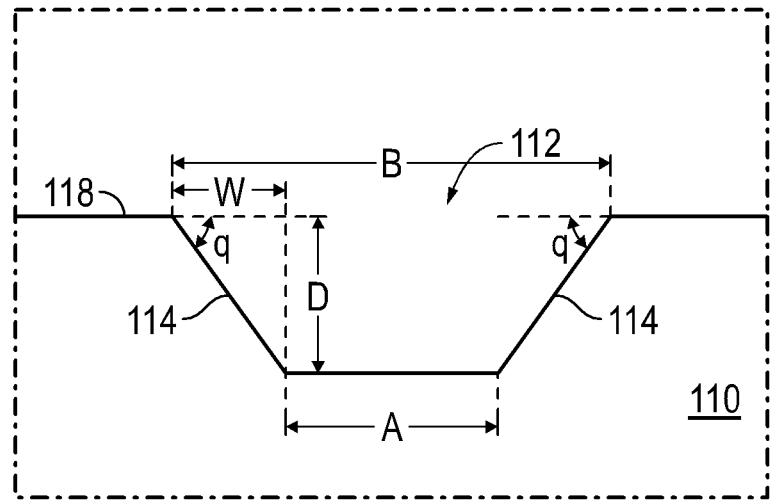
FIG. 10A shows an example of a detail view of section 10 of FIG. 9A.

FIG. 10A shows an example of a detail view of section 10 of FIG. 9A. It can be seen in FIG. 10A that the illustrated indentation 112 is in the shape of a frustra having a depth D, giving the indentation 112a frustroconical shape. The indentation 112 has a width B at the top opening, and narrows to a width A at the base of the indentation. The sidewall 114 is oriented at a tilted facet angle θ to the major surfaces of the embossed substrate 110, and extends a distance W inward from the top of the indentation 112 to the base, such that $\theta=\text{Tan}^{-1}$ (D/W). Where the angle θ remains constant around the indentation 112, the distance W is given by W=(B−A)/2. The size and shape of the indentations, and in particular the tilted angle θ relative to the horizontal substrate surface 118, may vary based in part on the material properties of the structures to be formed therein. In the illustrated implementation, the structures to be formed in the indentations 112 are reflective facets, and the sidewalls 114 of the facets may be oriented at roughly a 40-50 degree angle to the major surfaces of the embossed substrate 110, and in particular to the flat portions 118 of the surface of the substrate 110 between the indentations 112. In some implementations, the indentations 112 in which reflective facets will be formed may be greater than about 0.5 μm deep, and in further implementations may be between about 1 and 2 μm deep.

In other implementations, the angle θ of the sidewall 114 may be determined based in part on a variety of factors, such as the refractive index and other properties of the substrate 110 and of other layers/structures which will form a part of a finished optical structure. For example, because light reflected downward and out of the lower surface of the substrate 110 may pass through other layers in a finished device, the relative indices of refraction of these layers will affect the overall path of the reflected light due to refraction at the boundaries between those layers. In an implementation in which the substrate 110 forms part of a frontlight system overlying a reflective display, the tilted facet angle θ generally determines the angular direction along which down reflected light proceeds towards the lower surface of the substrate 110, and after being reflected by the underlying display, the resulting angular direction along which output light passes through the included optical layers of the complete frontlight system and outwards towards the viewer. This resulting angular output direction depends not only on the tilted fact angle θ, but also on all the refractive indices and corresponding physical thickness of each included material layer within the frontlight as a consequence of the refraction that occurs at the boundaries between those layers.

Figure 10B:
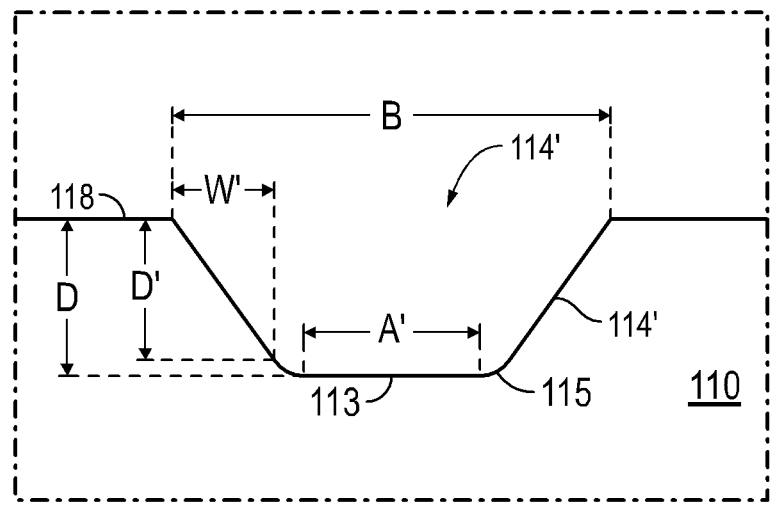
FIG. 10B shows an example of an alternate detail view of a section similar to that of FIG. 10A.

In other implementations, however, the sidewalls 114 may not be planar over their entire height. FIG. 10B shows an example of an alternate detail view of a section similar to that of FIG. 10A. In particular, in the indentation 112' of FIG. 10B, a curved section 115 extends between the planar region of sidewall 114' and the planar region of the base 113, in contrast to the angular intersection depicted in FIG. 10A. Such a curved section 115 may occur, for example, due to manufacturing limitations. Because the planar region of sidewall 114' is smaller than the planar region of sidewall 114 of FIG. 10A for a similarly dimensioned indentation 112', the planar region of sidewall 114' extends a distance W' inward from the top of the indentation 112' which is shorter than the distance W depicted in FIG. 10A for a similarly dimensioned indentation with an identical width B at the top opening and overall depth D. Similarly, the planar region of sidewall 114' extends a distance D' downward from the top of the indentation 112', which is less than the total depth D between the top of the indentation 112' and the base 113.

When a reflective material is deposited within indentation 112', the reflective material adjacent and conformal with the planar region of sidewall 114' of indentation 112' will redirect light in the same manner as reflective material adjacent the sidewall 114 of indentation 112 of FIG. 10A. While the size of the planar portion of sidewall 114 will be slightly less than the ideal planar sidewall depicted in FIG. 10A, the reduction in frontlight performance will be minimal, due in part to the relatively minor reduction in size of the planar region of sidewall 114' of indentation 112'. In addition, light reflected by the curved portion 115 will spread light into higher angular directions from a vertical output axis normal to the base 113. In addition, for sufficiently high angular spreading, where the light is reflected at a small angle relative to the base 113, the light may continue to propagate within the frontlight until it strikes a reflective surface adjacent a planar sidewall of another indentation 112' (not shown).

In an alternate implementation in which electrodes for use in a touchscreen are formed in the indentations 112, the sidewalls 114 may be formed at either a substantially right angle to the major surfaces of the embossed substrate 110, or at a very shallow angle to the major surfaces of the embossed substrate 110, so as not to interfere with the pattern of light propagating through the substrate 110. The embossing technique or other technique used to form the indentations 112 in the substrate 110 may also constrain the size and shape of the indentations 112. For example, certain embossing techniques may allow for the formation of indentations 112 which have a width to depth ratio of about 3:1 or 4:1, although other aspect ratios may be possible, as well.

Figure 9B:
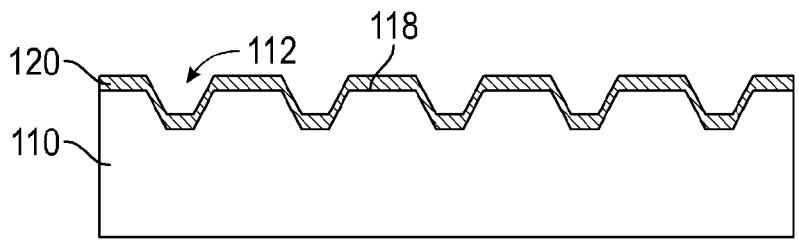

In FIG. 9B, a layer 120 of reflective material has been conformally deposited over the substrate 110, such that it coats both the indentations 112 and the flat portions 118 of the surface of the substrate 110 between the indentations 112. In one implementation, the reflective layer 120 may include a layer of aluminum or any other suitable reflective material. In one particular implementation, the reflective layer 120 may be a layer of aluminum roughly 1000 angstroms thick.

Figure 9C:
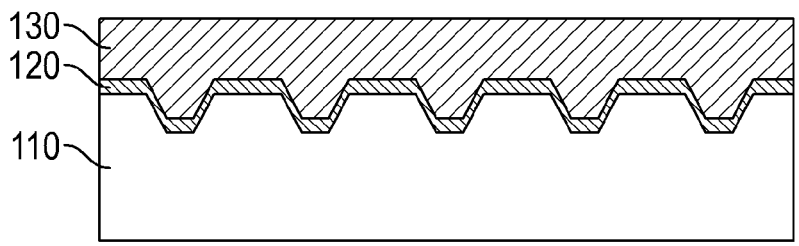

In FIG. 9C, a layer 130 of masking material has been deposited over the reflective layer 120. In the illustrated implementation, the masking layer 130 is a photoresist or other suitable opaque material which is deposited in a planarized fashion, such that the masking layer 130 has a substantially flat upper surface, and is thicker in the areas overlying the indentations 112 in the substrate 110. Because the masking layer 130 will shield the reflective material of reflective layer 120 from a viewer, the masking layer 120 is formed from a material which is substantially non-reflective, such that the masking layer reflects a relatively small amount of incident light back towards a viewer. In one implementation, the masking layer 130 can be planarized through the use of a doctor blade or similar tool to shape the upper surface of the masking layer 130. In another implementation in which the masking layer 130 includes a photoresist material, the planarizing may be accomplished by partially exposing the photoresist layer of the masking layer 130, overetching the masking layer 130, and cleaning the remaining masking layer 130.

Figure 9D:
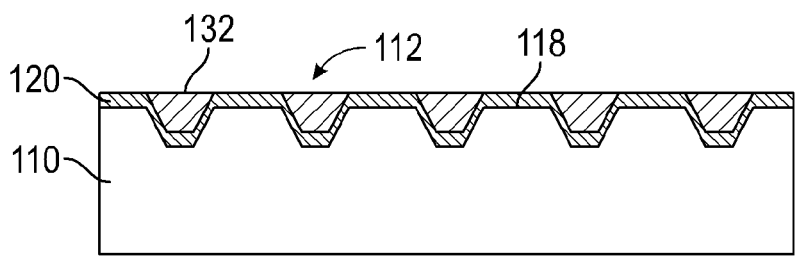

In FIG. 9D, the portions of the masking layer not overlying the indentations 112 have been removed. In one implementation, removal of the portions of the masking layer 130 not overlying the indentations 112 may be accomplished by etching the masking layer 130. For example, the masking layer 130 may be etched using a reactive ion etch or other suitable etch for a period of time sufficient to remove the thinner portions of the masking layer 130 overlying the flat portions 118, without removing the thicker portions of the masking layer 130 within the indentations 112. In another implementation in which the masking layer 130 includes a photoresist material, removal of the portions of the photoresist overlying the flat portions 118 may be accomplished by partially exposing the photoresist of masking layer 130 and developing away the thinner portions of the masking layer 130 overlying the flat portions 118 of the substrate 110. In still another implementation, rather than planarizing the masking layer 130 with a doctor blade or similar tool as discussed with respect to FIG. 9B, a doctor blade can be used to remove all or a significant portion of the masking layer 130 located outside of the indentations 112 in the substrate 110. In this implementation a lubricating layer, such as an alkylsilane or fluoroalkylsilane, can be applied to the overlying flat regions prior to resist application. This reduces the adhesion of resist in these locations and enables resist removal.

Figure 9E:
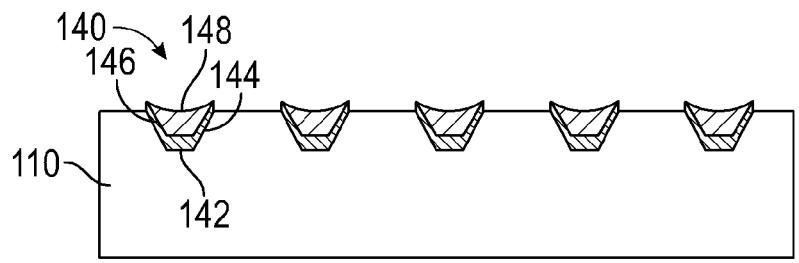

In FIG. 9E, the portions of the reflective layer 120 overlying the flat portions 118 of the substrate 110 have been removed via an etch or other suitable process, forming masked structures in the form of reflective facets 140 disposed within the indentations 112 of the substrate 110. Portions 132 of the masking layer located within the indentations 112 remain. The finished structure 100 includes an embossed substrate 110 having reflective facets 140 disposed within indentations 112 in the embossed substrate 110, and may be suitable, for example, as a faceted frontlight film for use in a frontlight system with a display device. In one implementation, the remaining photoresist may be used as a mask during such an etch, although an additional mask may be used in other implementations. The reflective facets 140 include a reflective lower portion 142 formed from the reflective layer 120, and a non-reflective upper portion 146 which serves as a mask. The reflective lower portion 142 has sidewalls 144 oriented at the same angle to the major surfaces of substrate 110 as the sidewalls 114 of the indentation 112 which they abut. Thus, the angle of the sidewalls 114 of the indentations 112 in the substrate 110 may define the angle of the reflective facets 140 formed therein. The non-reflective upper portion 146 of the reflective facet 140 masks the reflective material of reflective lower portion 142 from view. In some implementations, the upper surface 148 of reflective facet 140 is substantially coplanar with, or located below, the upper major surface of substrate 110, in order to facilitate deposition of further layers above the finished structure 100 or adhesion of further layers above the finished structure 100.

In another implementation, the masking layer 130 may be deposited in such a way that the masking layer 130 does not adhere to the portions of the reflective layer 120 overlying the flat portions 118 of substrate 110. For example, after the reflective layer 120 is deposited in FIG. 9B, a hydrophobic coating may be applied to the flat portions of the reflective layer 120 overlying the flat portions 118 of the substrate 110, such as through the use of a doctor blade to apply the coating. Suitable hydrophobic coatings may include, but are not limited to, alkyltrichlorosilanes, alkyltriethoxysilanes, perfluoroalkyltrichlorosilanes, and perfluoroalkylthriethoxysilanes. Alternately, a hydrophilic coating may be applied to the indentations 112, such as by depositing the coating over the entire substrate and using a doctor blade to scrape the coating off of the flat surfaces 118. Suitable hydrophobic coatings may include, but are not limited to, aminoalkyltrichlorosilanes and aminoalkyltrietholxysilanes. With either or both of these coatings in place, when the masking layer 130 is subsequently deposited over the reflective layer 120, the masking layer 130 may only adhere to the portions of the reflective layer 120 overlying the indentations 112 in the substrate 110. The masking layer 130 may then be etched or otherwise reduced in height if desired, or may be deposited in a thickness sufficiently thin that no further processing is necessary to form the reflective facets 140.

In an alternative implementation, the deposition of the reflective material to form the reflective surface adjacent the interior surfaces of the indentations 112 can be controlled via solution-based processing. A metallic and/or reflective ink, such as silver nanoparticle ink, aluminum nanoparticle ink, or a similar ink, can be deposited within the indentations 112 and cured to form a reflective surface. In one implementation, by treating the planar upper portions of the substrate between the indentations 112 with a hydrophobic coating prior to deposition of the metallic and/or reflective ink, deposition of the ink can be constrained to the indentations 112 not coated with the hydrophobic coating. The ink may then be applied by any suitable process, including but not limited to flexography or doctor blade coating. After deposition and possible curing of the ink a masking structure may be applied over the reflective surface, as described with respect to FIGS. 9C and 9D, for example. This masking structure may be a black resist as described above, but may also be a self-masked structure described in detail below.

Figure 11A:
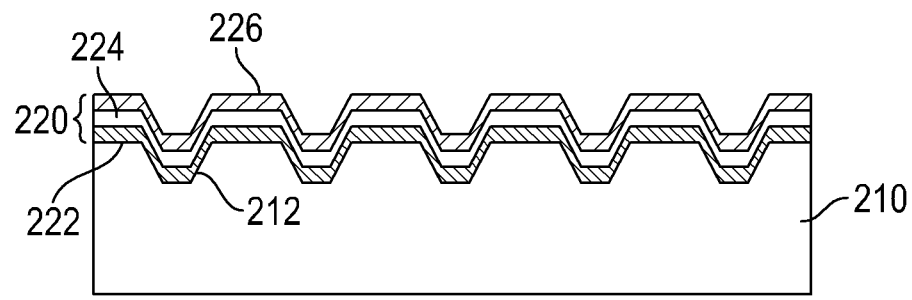
FIGS. 11A and 11B show an example of two steps in a process for forming self-masked structures on a flexible substrate.
Figure 11B:
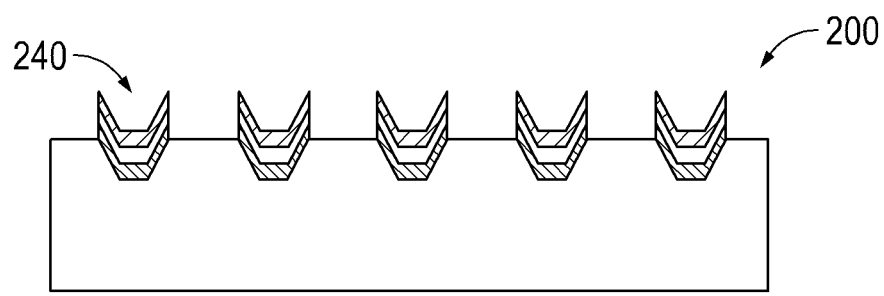

FIGS. 11A and 11B show an example of two steps in a process for forming self-masked structures on a flexible substrate. In this alternate implementation of a fabrication process, an interferometric stack of films has been deposited in place of reflective layer 120. FIG. 11A shows an example of an interferometric film stack 220 deposited on a substrate 210. The substrate 210 is an substrate having indentations 212 formed therein, similar to the substrate 110 of FIGS. 9A-9E. An interferometric film stack 220 may be conformally deposited on the substrate 210. In one implementation, the interferometric film stack 220 includes at least three films: a reflective layer 222 on the side of the stack 220 adjacent the substrate 210, a spacer layer 224, and an absorber layer 226 on the opposite side of the spacer layer as the reflective layer 222. With proper selection of the materials and thicknesses, the interferometric modulator may form an etalon which appears dark when viewed from the absorber side, which may alternately be referred to as an interferometric black mask.

In one implementation, the processes described with respect to FIGS. 9A-9E can be used with the interferometric film stack 220 of FIG. 11A deposited in place of the reflective layer 120 of FIG. 9B. A masking layer such as masking layer 130 can be removed from the finished structure 200, as the interferometric film stack 220 itself will not reflect a substantial portion of visible light back In such an implementation, the remaining portions 132 of the masking layer 130 (see FIG. 9D) can be removed to expose the interferometric film stack 220, forming a finished structure 200 with reflective facets 240 formed from sections of the interferometric film stack 220, as shown in FIG. 11B, to the viewer when viewed from the side of the stack 220 opposite the reflective layer 222. However, because the lower portion of the reflective sublayer 220 remains exposed, the reflective facet 240 can still redirect light downward and out of the substrate 210. In alternate implementations, the layer 220 shown in FIG. 11A can be patterned to form reflective facets 240 through the use of another masking process or other suitable alternate fabrication processes. In these implementations, because the reflective facet 240 includes a layer which serves both as part of an interferometric mask in addition to serving as a reflective facet layer, the reflective facet 240 may be considered a self-masking structure.

Thus, the reflective facets 240 include additional layers underlying the reflective layer 222 which cooperate with the overlying reflective layer to provide a masking effect. The degree of masking provided by these additional layers is dependent at least in part on the optical properties of an overlying layer. Implementations of masking structures may provide a degree of masking which is generally either independent of the optical properties of an overlying layer, such as an opaque masking layer, or at least partially dependent on the optical properties of an overlying layer, such as the addition of layers which cooperate with an overlying reflective layer to form an interferometric film stack.

Figure 12A:
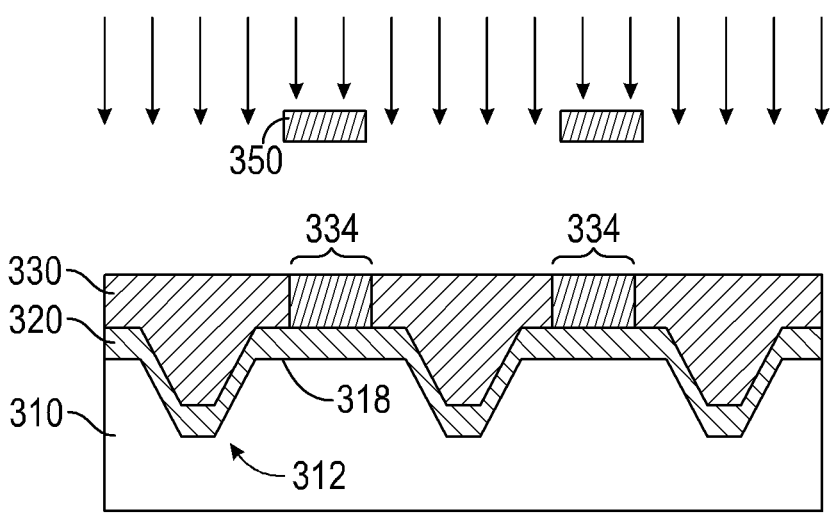
FIGS. 12A-12C show an example of process for fabricating masked facets and masked wires on the same flexible substrate.
Figure 12B:
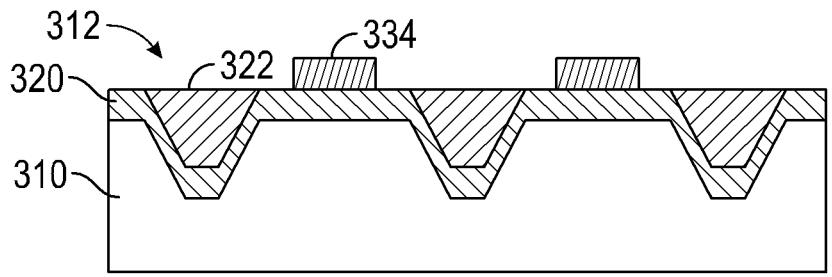
Figure 12C:
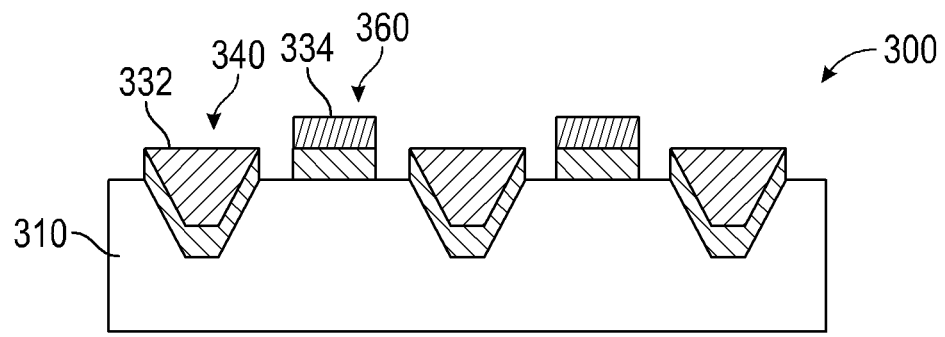

FIGS. 12A-12C show an example of process for fabricating masked facets and masked wires on the same flexible substrate. The process includes the steps of FIGS. 9A through 9C to provide an substrate 310 having indentations 312 formed therein, and covered with a conformally deposited reflective layer 320 and a masking layer 330, which may be planarized as shown. In alternate implementations, the reflective layer 320 can be replaced with an interferometric film stack such as stack 220 of FIG. 11A.

In FIG. 12A, the masking layer has been exposed using an additional photomask 350 to define protected portions 334 of the masking layer overlying flat portions 318 of substrate 310. In one implementation in which the masking layer 330 includes a photoresist, the masking layer 330 can be partially exposed with the additional photomask 350 in place, such that the portions of the masking layer 330 within the indentations 312 and the protected portions 334 remain substantially unexposed.

In FIG. 12B, the exposed portions of the masking layer 330 are etched away, leaving behind protected portions 334 of the masking layer 330 and portions 332 of the masking layer 330 within the indentations 312. The protected portions 334 of the masking layer 330 define wiring which can be used, for example, as electrodes within a touchscreen array, and the portions 332 of the masking layer 330 within the indentations 312 define reflective facets, as discussed above.

In FIG. 12C, the remaining portions 332 and 334 of the masking layer 330 can be used as a mask in an etching process to pattern reflective layer 320, forming a finished structure 300 which includes both masked reflective facets 340 and masked wiring 360. The masked reflective facets 340 are similar in structure to the masked reflective facets 140 of FIG. 9E. The masked wiring 360 is also similarly protected from undesirably reflecting light towards a viewer by the protected portions 334 of the masking layer 330.

In an implementation in which an interferometric film stack (such as the interferometric film stack 220 in FIGS. 11A-11B) is used instead of a single reflective layer 320, the residual portions 332 and 334 of the masking layer 330 can be removed after being used to pattern the interferometric film stack, as the film stack may itself appear dark from the absorber side.

Although such reflective facets and masked wiring may be made in any appropriate size or shape, the eventual use of a device including such structures may provide a reason to utilize a particular range of sizes or shapes. For example, these structures, or a substrate supporting these structures, may be utilized in a display device and positioned over the display, such that a viewer will view the display through an array of reflective facets and/or masked wiring. In such an implementation, constraints on the size of the reflective facets and/or masked wiring may prevent those structures from significantly impacting the appearance of the display device. For example, for handheld devices configured to be viewed at a distance of less than a few feet, the masked wiring may have a width of less than about 5 μm. Similar constraints may be placed on the size of the reflective facets. For other devices, appropriate constraints on the dimensions of the reflective facets and/or masked wiring may depend on a variety of factors, including the distance at which the device is intended to be viewed.

Figure 13:
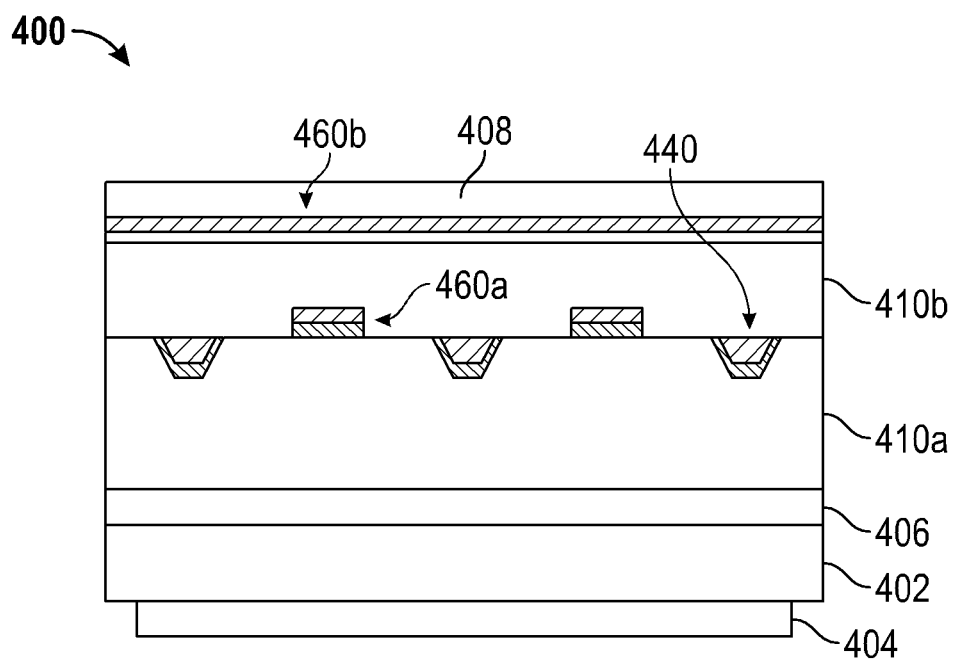
FIG. 13 shows an example of a display device incorporating a substrate having masked features formed thereon.

FIG. 13 shows an example of a display device incorporating a substrate having masked features formed thereon. The display device 400 includes a display substrate 402 having a reflective display array 404 formed thereon. A diffuser layer 406 or other optical layer may be positioned on the opposite side of the substrate 402 from the display array 404. A first flexible substrate 410a having masked features in the form of reflective facets 440 and masked wiring 460a formed thereon is located over the diffuser layer 406. A second flexible substrate 410b having masked wiring 460b formed thereon is located over the first flexible substrate 410a. The masked wiring 460b on the second flexible substrate 410b is arranged orthogonally to the masked wiring 460a on the first flexible substrate 410a to form a grid which can be used as part of a touchscreen system. In some implementations, the substrates 410a and 410b may be formed from different materials, as the flexible substrate 410b may not necessarily serve as part of a frontlight system. A cover glass 408, which may include additional optical layers, is located over the second flexible substrate 410b. Additional layers not shown, such as additional components or adhesive layers, may also be disposed at various locations throughout the display device 400.

Figure 14:
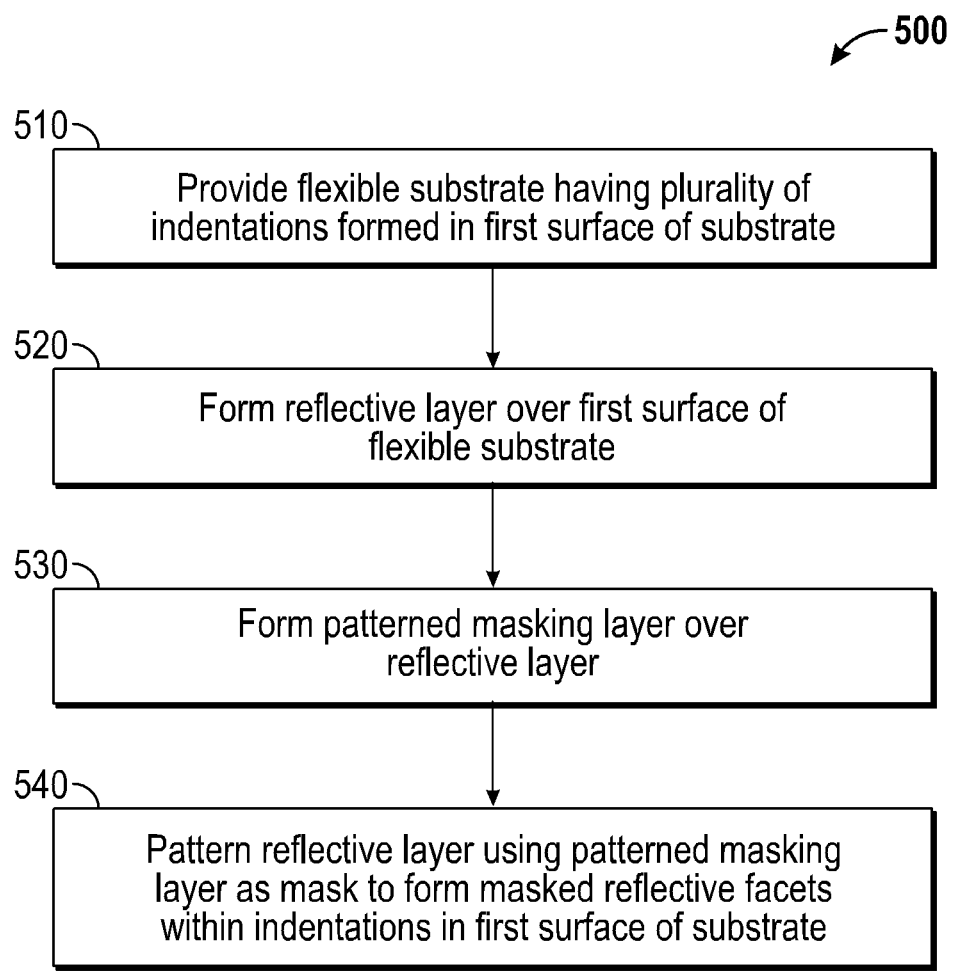
FIG. 14 shows an example of a flow diagram illustrating a manufacturing process for forming masked structures on a flexible substrate.

FIG. 14 shows an example of a flow diagram illustrating a manufacturing process for forming masked structures on a flexible substrate. The method 500 begins at a block 510, where a flexible substrate is provided. The flexible substrate may have a plurality of indentations formed in a first surface of the flexible substrate. As discussed above, this substrate may comprise any suitable light-transmissive material, including but not limited to PMMA or other plastics or glass materials. The indentations may be embossed or otherwise formed in the flexible substrate, or the substrate may be formed having the indentations formed therein, such as via a cast and cure process.

The method 500 then proceeds to a block 520, where a reflective layer is formed over the first surface of the flexible substrate. In some implementations, this reflective layer may be a single layer of aluminum, but in other implementations, additional layers can be deposited at this point to form an interferometric film stack or other structure.

The method 500 then proceeds to a block 530, where a patterned masking layer is formed over the reflective layer. This patterned masking layer may be formed using any of the methods discussed above, or by any other suitable method. In one implementation, a deposited photoresist layer can be partially exposed and/or exposed using a mask to selectively develop and remove certain portions of the photoresist. In other implementations, a hydrophilic layer deposited within the indentations in the substrate, or a hydrophobic layer deposited outside of the indentations, may be used to control which portions of a deposited masking layer adhere to the substrate and remain in place.

The method 500 then proceeds to a block 540, where the reflective layer is patterned using the patterned masking layer as a mask. In some implementations, this may be done to form masked reflective facets within the indentations in the flexible substrate. In further implementations, masked wiring may also be formed on non-indented portions of the substrate. In further implementations, such as when an interferometric film stack was deposited in place of a single reflective layer, the patterned masking layer may be removed, as the structures formed on the substrate may be self-masking.

Figure 15A:
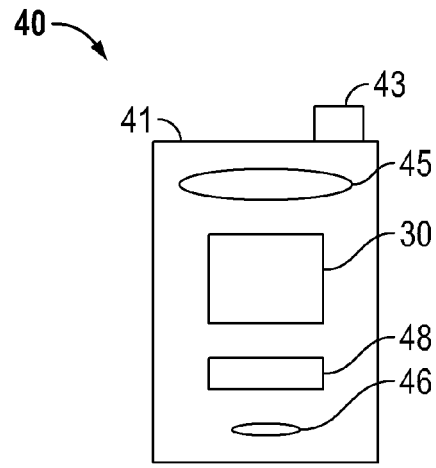
FIGS. 15A and 15B show examples of system block diagrams illustrating a display device that includes a plurality of interferometric modulators.
Figure 15B:
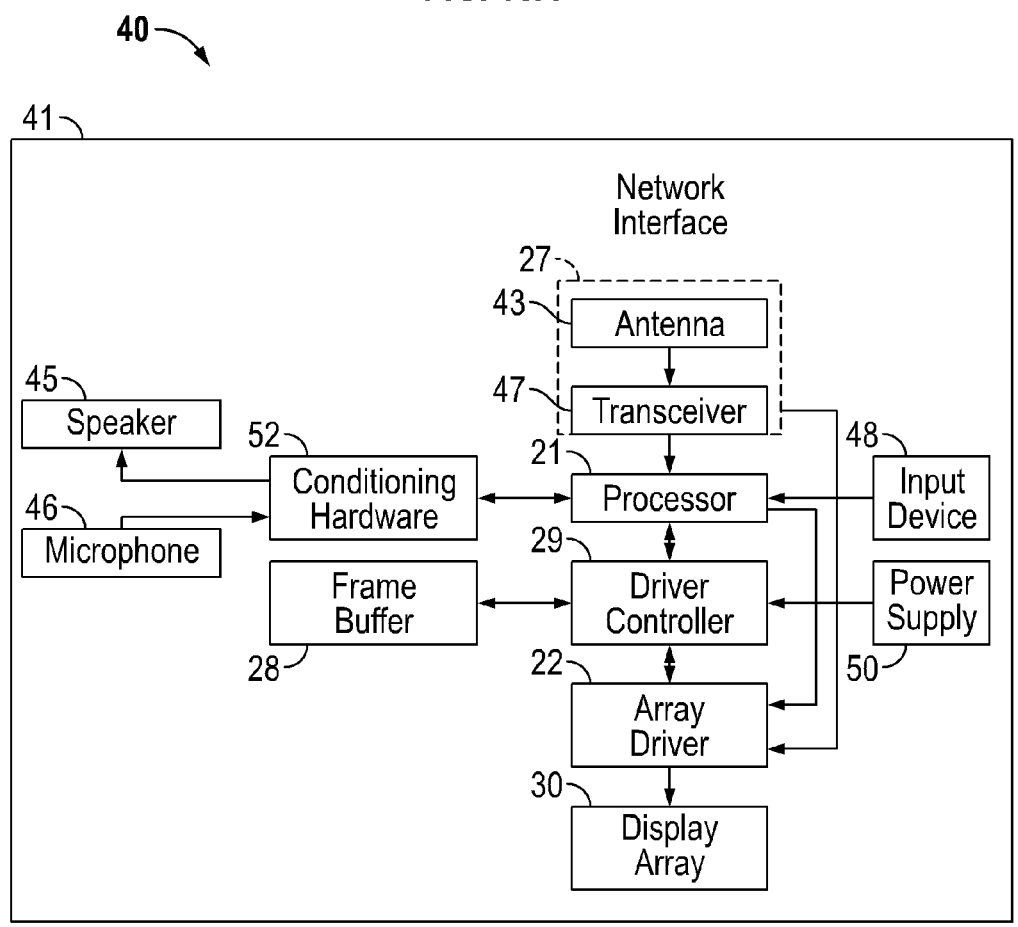

FIGS. 15A and 15B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 15B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus, comprising:
a flexible substrate having a plurality of indentations formed in a first surface of the substrate;
reflective facets located at least partially within the indentations, wherein the reflective facets include:
a reflective surface located on the side of the facet facing the indentations; and
a facet masking structure on the side of the reflective facet opposite the substrate, wherein the facet masking structure is less reflective than the reflective surface; and
a plurality of masked wires located on the flexible substrate, wherein each of the plurality of masked wires includes:
a strip of conductive material; and
a wire masking structure having at least one wire masking layer, wherein the wire masking layer is less reflective than the strip of conductive material, and wherein the strip of conductive material is located between the wire masking structure and the substrate.

2. The apparatus of claim 1, wherein the facet masking structure includes a layer of photoresist.

3. The apparatus of claim 1, wherein the facet masking structure includes an interferometric black mask.

4. The apparatus of claim 1, wherein the plurality of masked wires extend generally parallel to one another.

5. The apparatus of claim 1, wherein the first surface of the substrate includes flat regions located between the indentations in the substrate, and wherein the plurality of masked wires extend over the flat regions of the first surface of the substrate.

6. The apparatus of claim 1, wherein the wire masking structure includes a layer of photoresist.

7. The apparatus of claim 1, wherein the wire masking structure includes an interferometric dark mask.

8. The apparatus of claim 1, wherein the plurality of masked wires are less than about 5 µm in width.

9. The apparatus of claim 1, wherein the first surface of the substrate includes flat regions located between the indentations in the substrate, and wherein the reflective facet includes an angled sidewall oriented at an angle to the flat regions of the substrate.

10. The apparatus of claim 9, wherein the reflective facet has a frustroconical shape at least about 0.5 µm in height.

11. The apparatus of claim 9, wherein the angle at which the angled sidewall is oriented relative to the flat regions of the substrate is between about 40° and about 50°.

12. The apparatus of claim 1, wherein the reflective surface includes aluminum.

13. The apparatus of claim 1, wherein the reflective surface includes a metallic ink.

14. The apparatus of claim 1, additionally comprising:
a display substrate, wherein the flexible substrate is located between the display substrate and the reflective facets, and wherein the reflective surfaces of the reflective facets face the display substrate; and
a reflective display located on the opposite side of the display substrate from the flexible substrate.

15. The apparatus of claim 14, wherein the flexible substrate additionally includes a plurality of masked wires formed on the substrate.

16. The apparatus of claim 15, additionally comprising a second flexible substrate located on the opposite side of the first flexible substrate as the display substrate, wherein the second flexible substrate includes a second plurality of masked wires formed on the second flexible substrate, and wherein the first plurality of masked wires extend substantially orthogonally to second plurality of masked wires.

17. The apparatus of claim 14, further comprising:
a processor that is configured to communicate with the display, the processor being configured to process image data; and
a memory device that is configured to communicate with the processor.

18. The apparatus of claim 17, further comprising a driver circuit configured to send at least one signal to the display.

19. The apparatus of claim 18, further comprising a controller configured to send at least a portion of the image data to the driver circuit.

20. The apparatus of claim 17, further comprising an image source module configured to send the image data to the processor.

21. The apparatus of claim 20, wherein the image source module includes at least one of a receiver, transceiver, and transmitter.

22. The apparatus of claim 17, further comprising an input device configured to receive input data and to communicate the input data to the processor.

23. A method of fabricating an apparatus, comprising:
providing a substrate having a plurality of indentations formed in a first surface of the substrate;
forming a reflective layer over the first surface of the substrate;
forming a patterned masking layer over the reflective layer; and patterning the reflective layer using the patterned masking layer as a mask to form masked reflective facets within the indentations in the first surface of the substrate and to form masked wiring extending over flat portions of the first surface of the substrate located between the indentations in the first surface of the substrate.

24. The method of claim 23, wherein the substrate is a flexible substrate.

25. The method of claim 23, wherein the substrate is substantially rigid.

26. The method of claim 23, wherein the forming a patterned masking layer includes:
forming a hydrophobic layer over portions of the first surface of the substrate, wherein the hydrophobic layer does not cover the indentations within the first surface of the substrate; and
forming a masking layer over the hydrophobic layer, wherein the portions of the masking layer not in contact with the hydrophobic layer form a patterned masking layer.

27. The method of claim 23, wherein the forming a patterned masking layer includes:
forming a hydrophilic layer within the indentations within the first surface of the substrate; and
forming a masking layer over the hydrophilic layer, wherein the portions of the masking layer in contact with the hydrophilic layer form a patterned masking layer.

* * * * *